Nov. 3, 1970 N. M. LOUDER 3,537,794

APPARATUS FOR THE AUTOMATIC ANALYSIS OF A PLURALITY OF BLOOD SAMPLES WITH MEANS FOR AGITATION OF EACH SAMPLE

Filed Aug. 14, 1968 4 Sheets-Sheet 1

INVENTOR.
Nevitt M. Louder
BY Webb Burden Robinson & Webb
HIS ATTORNEYS

INVENTOR.
Nevitt M. Louder
BY Webb Burden Robinson & Webb
HIS ATTORNEYS

INVENTOR.
Nevitt M. Louder
BY Webb Burden Robinson & Webb
HIS ATTORNEYS

INVENTOR.
Nevitt M. Louder
BY Webb Burden Robinson & Webb
HIS ATTORNEYS

United States Patent Office 3,537,794
Patented Nov. 3, 1970

3,537,794
APPARATUS FOR THE AUTOMATIC ANALYSIS OF A PLURALITY OF BLOOD SAMPLES WITH MEANS FOR AGITATION OF EACH SAMPLE

Nevitt M. Louder, Penn Hills, Pa., assignor to Fisher Scientific Company, Pittsburgh, Pa., a corporation of Pennsylvania Filed Aug. 14, 1968, Ser. No. 752,690
Int. Cl. G01n 33/16
U.S. Cl. 356—40 14 Claims

ABSTRACT OF THE DISCLOSURE

A blood analyzer having a turntable loosely holding receptacle holders which loosely hold specimen cups. A paramagnetic pin extends from each receptacle holder into a magnetic field of changing polarity positioned adjacent the sampling station whereby the cups are oscillated. A filter disc is rotatably mounted over the specimen cup at the sampling station. A sampling probe is mounted adjacent the turntable and can be moved vertically through the filter disc into and out of a specimen cup and can be moved horizontally to deposit a specimen in cuvets positioned adjacent the turntable. Means including a valve are provided for selectively drawing specimens from the cuvets and passing them through a blood counter.

My invention relates to an apparatus for automatically analyzing whole blood samples. More particularly, it relates to an improved automatic analyzer of whole blood which assures accurate results by keeping the samples thoroughly mixed and preventing evaporation and contamination of the specimens.

Analysis of blood samples is a major problem, particularly in hospitals and clinics where large numbers of samples must be analyzed daily. The time and expense required to individually analyze the number of samples which must be processed each day is enormous. Attempts have been made to automatically analyze a large number of samples. However, none have been completely successful due to a number of problems.

Blood specimens rapidly lose their homogeneity, the blood cells settling. A whole blood sample will also deteriorate through evaporation of the serum which concentrates the number of blood cells remaining and consequently increases the hemoglobin content.

Because of the delicacy and accuracy required in analyzing blood specimens, contamination and crossover of various blood specimens is an ever present problem. Obviously, as the number of processing steps for testing the blood specimens increases, the possibility of contamination or specimen crossover is also increased.

My invention provides an automatic analyzer which overcomes these problems. My analyzer provides a thoroughly mixed and homogeneous specimen for analysis. At the same time, evaporation is minimized so that the test results truly reflect an accurate analysis of the blood of the sample. My invention also greatly reduces the possibility of contamination or specimen crossover. In addition, my invention reduces the number of processing steps necessary for testing blood specimens thereby increasing the efficiency and time of any given analysis.

Briefly stated, the analyzer comprises a turntable containing a plurality of loosely held receptacle holders into which individual specimen cups loosely fit. A magnetic pin extends from the base of the receptacle holders into the field of a rotating magnet which oscillates the cups thereby keeping the blood sample homogeneous. A floating shield may be positioned over all but a few of the specimen cups to prevent evaporation of the blood in the specimen cups. Two cuvets for receiving samples from the specimen cups are positioned adjacent the turntable. A filter paper disc is rotatably mounted adjacent the turntable with at least a portion extending over one of the specimen cups. A sampling probe is also mounted adjacent the turntable and movable horizontally from a position above the filter paper disc and the specimen cup to a position above the cuvets and movable vertically from a position above the filter disc through the filter and into the specimen cup and from the position above the cuvets to a position inside or close to the cuvets. Means including a valve are provided for selectively drawing the solutions from the cuvets and passing them through an analyzer.

In the accompanying drawings, I have shown one preferred embodiment of my invention in which:

FIG. 1 is a plan view of the specimen cup;

Figure 1:
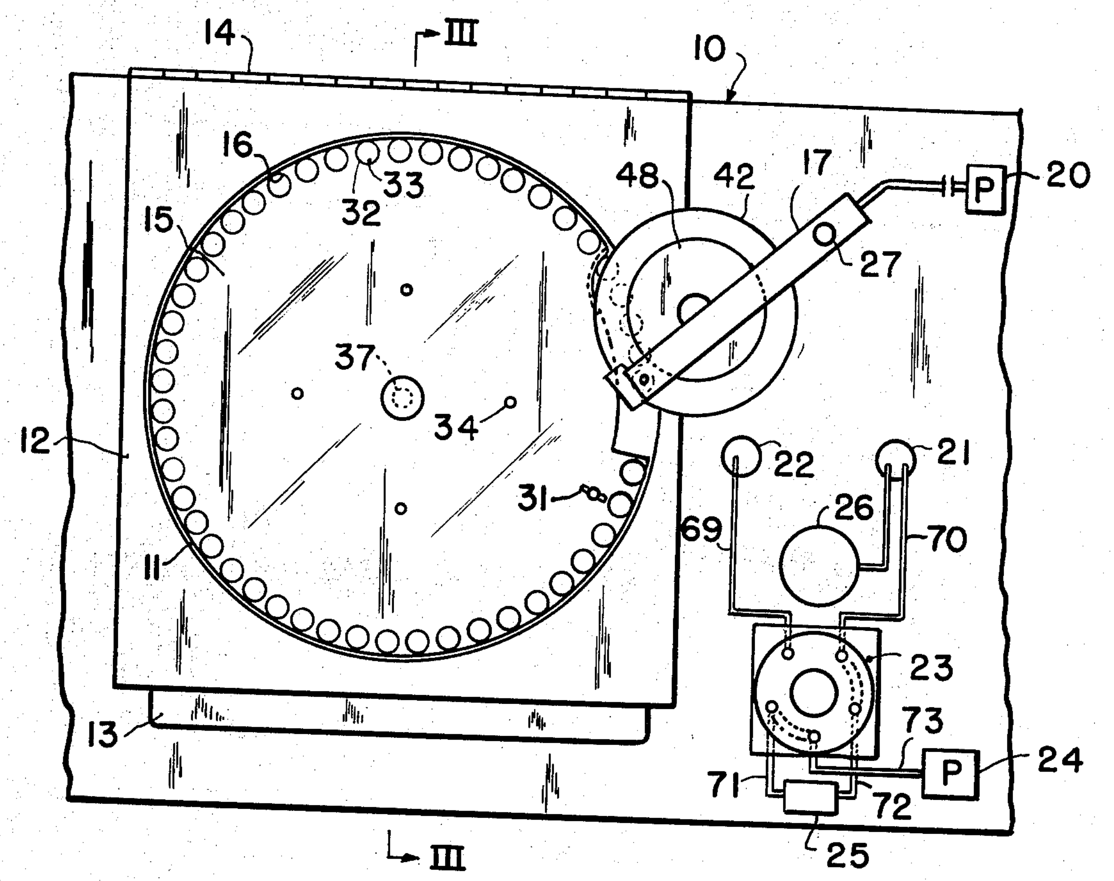
FIG. 1 is a plan view showing the general arrangement of the elements of my invention.
Figure 2:
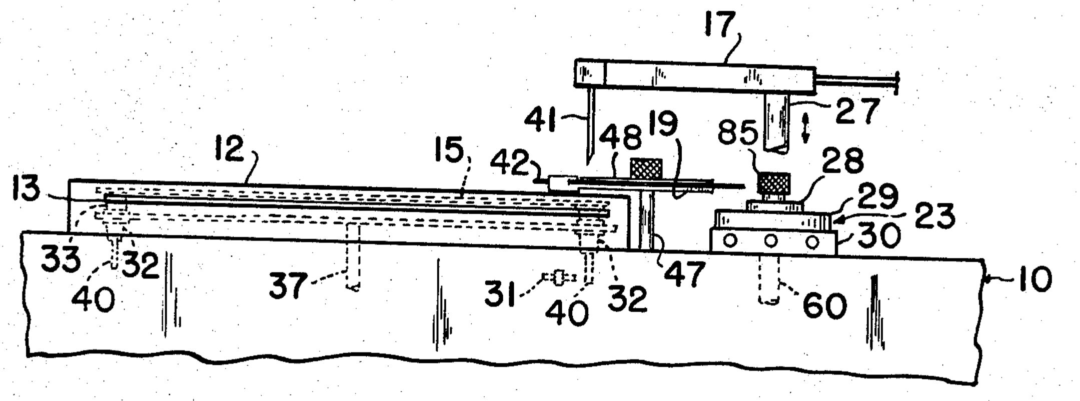
FIG. 2 is a front elevation of the general arrangement.

The various elements of the blood analyzer are housed on a support cabinet designated generaly 10. A circular turntable 11 having a plurality of holes 16 about its periphery is rotatably mounted on the top of cabinet 10. The turntable is enclosed by an outer cover 12 which is pivotally mounted to cabinet 10 by hinge 14. A handle 13 is provided for raising and lowering the cover 12.

Figure 6:
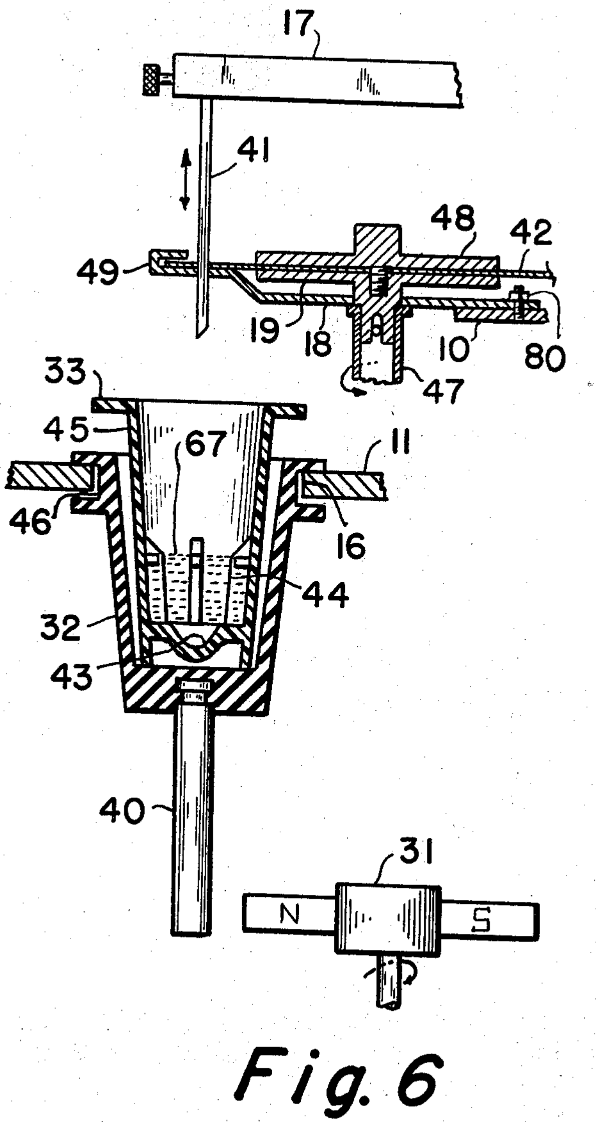
FIG. 6 is a partial section through a receptacle holder, specimen cup and filter disc and showing the position of the magnetic drive and syringe needle.

Receptacle holders 32 are positioned in the holes 16 about the periphery of turntable 11. (See FIG. 6.). The receptacle holders are preferably formed of a very soft rubber and have a grommet 46 around their periphery by which the receptable holders are loosely held in the holes 16 in the turntable. A specimen cup 33 adapted to hold one blood specimen fits loosely in each of the receptacle holders. The specimen cups can be inexpensively made by injection molding from plastic materials such as polyethylene so they may be thrown away after one use. The side walls 45 of the specimen cup 33 are formed with four inwardly projecting fins 44 near the bottom and the bottom also has a slight conical-shaped recess 43 in the center. The fins 44 and recess 43 assist in stirring and preventing coagulation of the blood specimen. The fins 44 also serve as a fill-mark for obtaining the proper amount of specimen.

Figure 9:
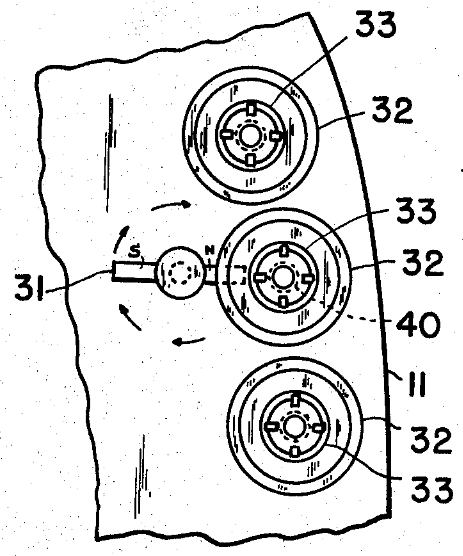
FIG. 9 is a plan view of a segment of the turntable showing three receptacle holders within the magnetic field of the rotating magnet.
Figure 12:
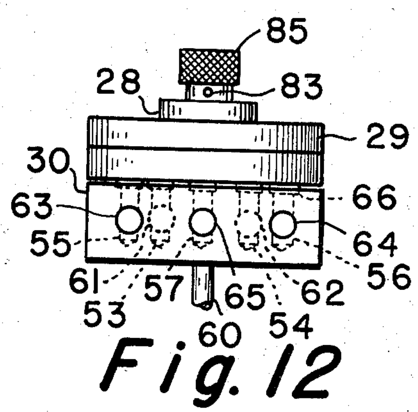
FIG. 12 is a front elevation of the valve.

A major problem in blood analysis is that blood cells settle rapidly and thus a specimen loses its homogeneity if allowed to sit for any period of time. However, an automatic blood analyzer must be able to store many specimens and consecutively present those specimens for sampling and analysis. A specimen may be held in the analyzer for an hour or more before it is sampled and analyzed. For example, in my invention if forty-eight different blood specimens are positioned about the turntable 11, the last specimen would sit on the turntable for about 1¼ hours before it is sampled. Therefore, I have provided means for thoroughly mixing and resuspending the blood specimen just prior to sampling. A paramagnetic pin 40, about which the receptacle holder 32 is tightly molded, extends a short distance downwardly from the bottom of the holder. A rotating north-south magnet 31 is positioned beneath the turntable near the sampling point and immediately adjacent the circular path prescribed by the paramagnetic pins as the turntable rotates. The rotating magnet 31 forms a magnetic field of constantly changing polarity through which the paramagnetic pin 40 of the receptacle holder 32 passes just prior to the time a sample is taken from the specimen cup held by the holder. The constantly changing polarity of the magnetic field causes the receptacle holder which is loosely held to the turntable and, in turn, the specimen cup which is fitted loosely in the receptacle holder to oscillate thoroughly mixing and resuspending the blood specimen contained in the cup. Preferably, the rotating magnet is positioned and has sufficient strength that the field it creates will oscillate the three receptacle holders positioned immediately in front of the sampling station. (See FIG. 9.).

Figure 3:
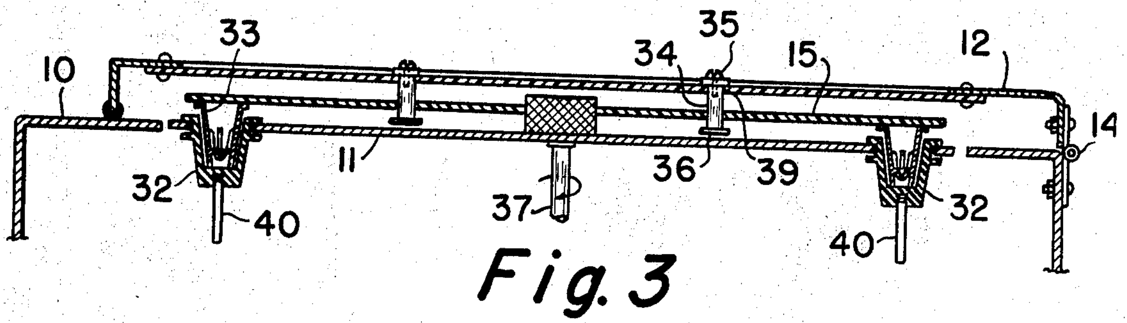
FIG. 3 is a section taken on lines III—III of FIG. 1 showing only the turntable and lid arrangement.
Figure 4:
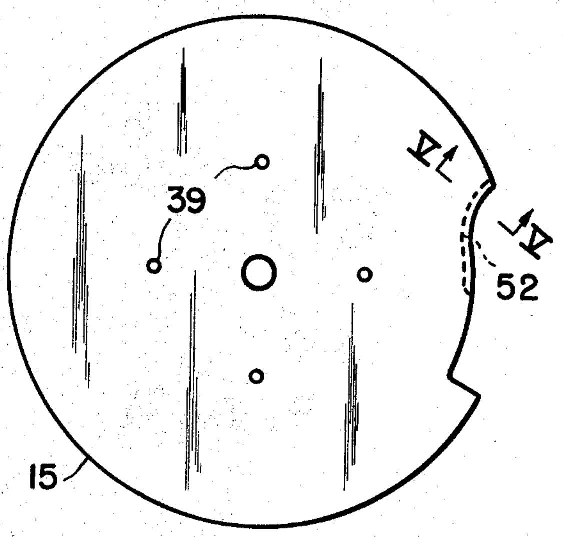
FIG. 4 is a plan view of the floating shield.
Figure 5:
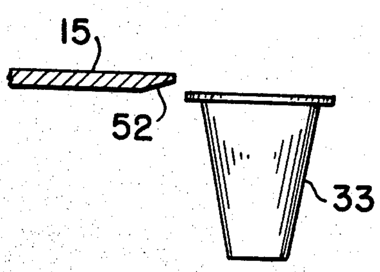
FIG. 5 is a section taken on lines V—V of FIG. 4.
Figure 7:
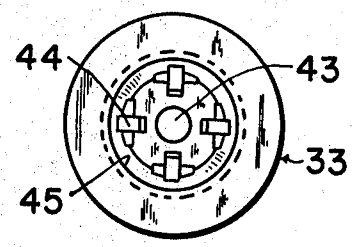

Another problem in automatic blood analysis is that of specimen evaporation. Depending upon ambient temperature and humidity, as much as 10 percent of the specimen serum volume may be lost due to evaporation. On a whole blood sample, evaporation will reduce the volume of the serum content only, which has the effect of concentrating the number of blood cells remaining and consequently increasing the hemoglobin content. To minimize the evaporation, I have provided a shield 15 shown in detail in FIGS. 3, 4 and 5. The shield 15 is freely suspended from the outer cover 12. Pins 34 which extend through holes 39 of shield 15 are connected to the cover 12 by bolt 35. Pins 34 have a flange 36 at their bottom end which is larger than the holes 39 and the shield 15 is thereby prevented from completely falling away from cover 12. When cover 12 is in the closed position, the shield 15, which basically is circular and of the same dimension as turntable 11, rests on the top surface of the specimen cups 33 effectively closing-off the top opening of each cup. The specimen cups present a uniform, level surface upon which the shield may rest, thus minimizing any voids between the cup opening and the atmosphere. Although turntable 11 which rotates about shaft 37 during processing to bring each of the receptacle holders 32 and the specimen cups 33 to the sampling point, the shield 15 is prevented from rotating by pins 34. However, the polyethylene cups slide easily under the weight of the shield. As shown in detail in FIG. 4, shield 15 has a cutout portion at one area on its perimeter to allow the cups to be oscillated as described above and to permit sampling. The cutaway portion of the shield 15 also has chamfered edges 52 as shown in FIG. 5. The shield 15, as well as the outer cover 12, may be made out of a translucent plastic material such as a methacrylate, so that the specimens in the specimen cups 33 can be observed at all times.

A sample of blood is removed from the specimen cups 33 by sample probe 17 which is mounted on elevator shaft 27 positioned adjacent the turntable. Sample probe 17 is able to move up and down along a vertical axis as well as rotate in a horizontal plane about the vertical axis. This two-fold movement enables the sampling probe to move into and out of the specimen cup and to move laterally to deposit a sample in cuvets 21 and 22. Syringe needle 41 of sample probe 17 draws a sample from a specimen cup by means of suction pump 20. To discharge the sample contained in the syringe needle 41, the suction pump 20 is merely reversed.

Figure 10:
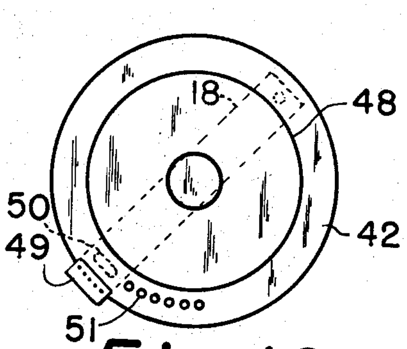
FIG. 10 is a plan view of the wiper arrangement.
Figure 8:
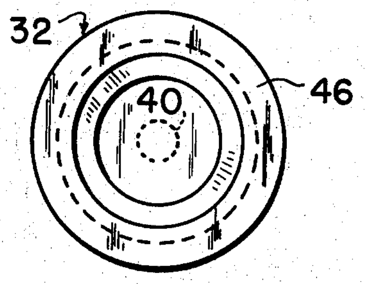
FIG. 8 is a plan view of the receptacle holder.
Figure 11:
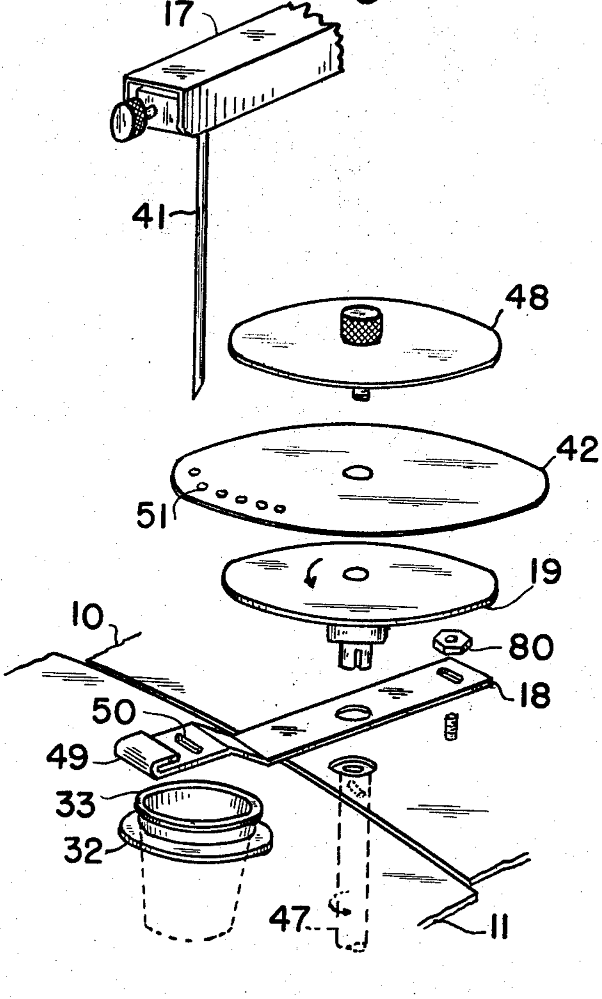
FIG. 11 is an exploded isometric of the wiper arrangement.

It is essential that the syringe needle be kept clean at all times. Any blood from a previous sample adhering to the surface of the needle can cause contamination of a following specimen and an erroneous analysis. To avoid this I have provided a wiping system consisting of a disc of filter paper 42, supported by a rotating table 19 and a paper support 18 (see FIGS. 9 and 10). The disc of filter paper rests on table 19 which has a diameter smaller than the diameter of the filter paper disc. Table 19 is keyed to rotating drive shaft 47 mounted on cabinet 10 adjacent the turntable 11. The shaft 47 is directly linked or indexed to the shaft 37 on which the turntable rotates so the filter disc rotates each time the turntable roates. The filter disc preferably rotates the same amount that the turntable rotates.

A circular cover 48 having approximaely the same diameter as table 19 is threaded into shaft 47 and holds the filter disc to the table 19. Paper support 18 is mounted on shaft 47 beneath table 19 and is fastened at one end to the top surface of cabinet 10 by means such as nut and bolt 80 to prevent its rotation with shaft 47.

Support 18 is a flat, rectangular piece of sheet metal which extends from shaft 47 a distance greater than the diameter of the filter disc 42 and has the end portion turned back on itself to form a U-shaped clip 49 into which the periphery of the filter disc fits. The support is positioned directly above the specimen cup in sampling position and has a hole 50 adjacent the end and above the cup to allow passage of the needle 41 of probe 17 through the support after passing through filter disc 42 and then into a specimen cup (see FIG. 6). Thus, the support holds the filter disc in place preventing its bending downwardly under pressure of the syringe needle as it descends toward the specimen cup and thus preventing the filter disc from adhering to the needle and bending upwardly as the needle is withdrawn.

Since the movement of table 19 is synchronized with that of turntable 11, every time a new specimen cup 33 is brought into sampling position, a clean portion of the filter paper 42 is also brought into position above the specimen cup. Syringe needle 41 must pass through the filter disc both as it enters the cup and as it leaves the cup (causing holes 51 in filter disc 42) and its surface is wiped clean by the filter paper disc.

Two cuvets 21 and 22 are positioned on the cabinet 10 to receive the blood samples to be analyzed. Initially, cuvet 21 receives the blood sample from probe 17. Thereafter, a diluent is added to the sample and probe 17 transfers a portion of the diluted sample to cuvet 22. The samples are drawn from the cuvets by a pump 24 to blood counter 25.

Valve 23 (see FIGS. 12–16) controls the flow of blood from the cuvets 21 and 22 to the blood counter. Valve 23 includes a lower stationary member 30 and a rotor member 29 through which the blood sample travels.

Lower member 30 has five spaced passageways 61, 62, 63, 64, and 65, each of which extends from a countersunk opening in the top surface 53, 54, 55, 56, and 57, respectively, to an opening in one of the side walls which is connected by tubing to other elements of the analyzer. Tubing 69 connects passageway 61 with red blood cell cuvet 22. Passageway 62 connects with hose 70 which leads to white blood cuvet 21. Passageway 63 connects near the top of passageway 55 and passageway 64 connects near the top of passageway 56. Passageways 63 and 64 are connected to opposite sides of blood counter 25 by hoses 71 and 72, respectively. Passageway 65 leads through hose 73 into valve pump 24 which supplies the suction to move the blood samples through the valve. A hose, not shown, leads from the pump 24 to a disposable station for disposing of the samples after they have been analyzed. All the tubing or hoses should be made of a material which can withstand the chemical attack of the fluids passing therethrough. Conventional Tygon tubing has been found acceptable.

Figure 13:
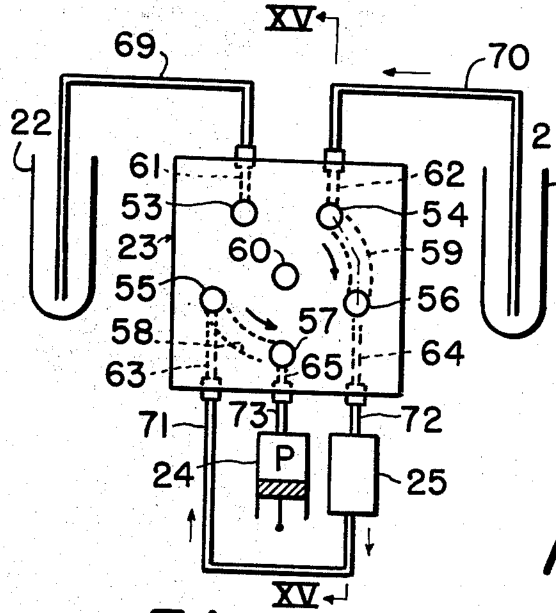
FIG. 13 is a diagrammatic illustration of the delivery of a sample from one cuvet.
Figure 16:
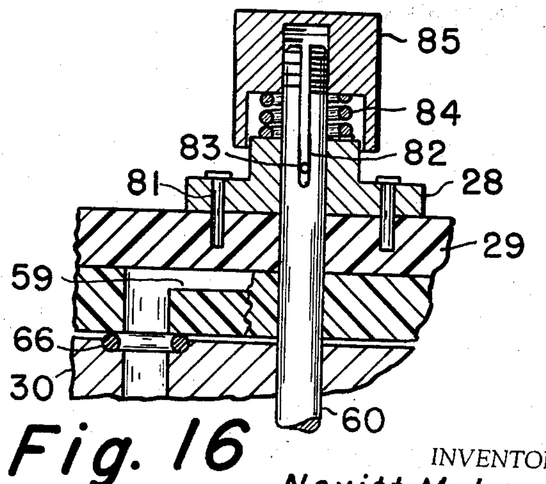
FIG. 16 is a close-up of a segment of FIG. 15.

The five openings 53–57 are countersunk downwardly from the top surface of the lower member 30 and an O-ring is inserted in each of the countersunk portions. The O-rings extend slightly above the top surface of bottom member 30, as shown in FIG. 16. Rotor member 29 rests on the O-rings 66. The O-rings 66 are positioned in stationary bottom member 30. There are two channels 58 and 59 recessed in the bottom surface of the rotor member 29. Channels 58 and 59 are sized and positioned to serve as passageways between adjacent passageways in lower stationary member 30. As shown in FIG. 13, the positioning of rotor member 29 (not shown) is such that channel 59 is connecting opening 54 of passageway 62 with opening 56 of passageway 64. At the same time, channel 58 is connecting opening 55 of passageway 63 with opening 57 of passageway 65. In this position, valve pump 24 draws a sample from cuvet 21 through tubing 70, through passageway 62 of the lower member, through channel 59 of the rotor member, through passageway 64 in the lower member, through tubing 72, and through the blood counter 25.

Figure 14:
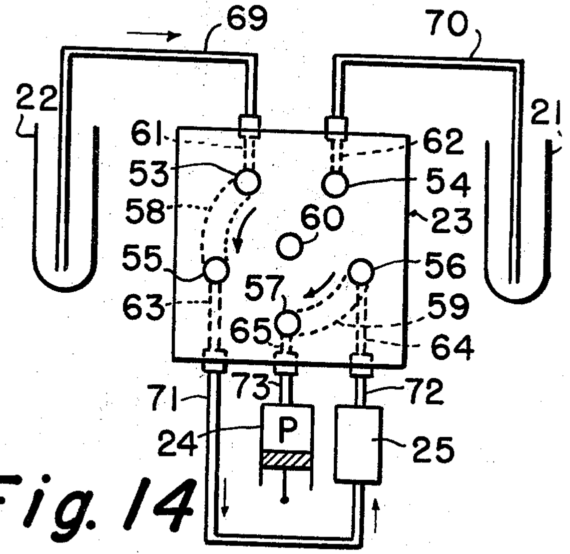
FIG. 14 is a diagrammatic illustration of the delivery of a sample from the other cuvet.
Figure 15:
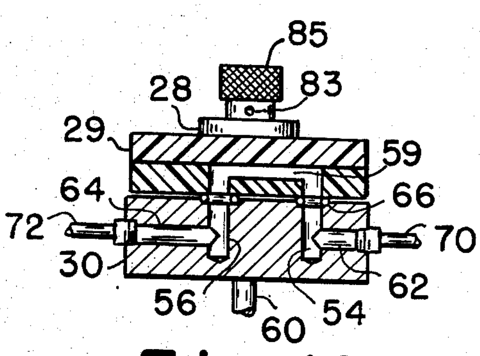
FIG. 15 is a section taken on lines XV—XV of FIG. 13.

In FIG. 14 rotor member 29 has been rotated so that channel 59 now connects opening 56 of passageway 64 with opening 57 of channel 65 and channel 58 connects opening 53 of passageway 61 with opening 55 of passageway 63. Thus, the valve pump 24 now draws a blood sample from cuvet 22 through tubing 69, through passageway 61 in the lower member, through channel 58 in the rotor, through passageway 63, through tubing 71 and through blood counter 25. An important feature of the valve is its ability to reverse the flow of the samples through the blood counter 25. Samples from cuvet 21 flow through the blood counter in the opposite direction from samples from cuvet 22. This tends to eliminate any jam in the counter which could cause contamination.

The stationary and rotor members of the valve are made of plastic materials in order to prevent any chemical attack by the samples passing through the members. Methacrylate and Teflon are examples of suitable materials. The stationary member 30 is fastened by any suitable means to the top surface of the cabinet 10. A metal hub 28 is fastened to the top surface of rotor member 29 by pins 81. A rotary drive shaft 60 extends from within the cabinet through the stationary member and through the rotary member. The upper end of the shaft has a longitudinal slot 82. A pin 83 extends through hub 28 and through slot 82 whereby rotary motion of the shaft is imparted to rotor member 29. A nut 85 is threaded onto the upper end of the drive shaft. A spring 84 is positioned between the nut and the upper end hub.

Since the rotor member 29 rides on O-rings 66, the sealing pressure present is limited to that exerted on the rings and may be varied by the extent to which nut 85 is tightened. The continued use of the valve will actually improve with wear because the valve will tend to set itself when rotated into its various positions. The lubrication is provided by the blood sample itself and the diluents employed with the blood samples. These diluents, such as saline solution or saline solution plus a small amount of detergent, act a excellent lubricating sources.

Reservoir 26 (see FIG. 1) which contains hemolyte, a lysing agent, is connected by tubing to cuvet 21. The hemolyte destroys the red blood cells prior to the white blood cell determination. In addition, the hemolyte develops color for hemoglobin determination.

Suitable drive mechanisms and means of synchronization of all the parts are conventional and are known to those skilled in the art. A master programmer can be located inside of cabinet 10. For example, the program for controlling the steps necessary to complete the analysis of one sample can be contained on a disc. The movement of the disc affects the passage of light into various light pipes leading to photocells which activate and sustain a function controlled by that particular light channel. The function continues until an opaque section or an overriding control develops.

The optical system contained in blood counter 25 which actually makes the blood analysis forms no part of the invention and thus is not shown. A suitable optical system known to those skilled in the art is one comprised of two assemblies. A photometer may be used for measuring the hemoglobin content by light absorption techniques in grams of hemoglobin per hundred milliliters of whole blood. An electronic counting system which counts the flashes of light refracted from the blood sample may be used for counting red and white blood cells. Because of the different size of red and white blood cells, the counter should be adjustable to operate at two different sensitivity levels. The white blood cells are counted in number of cells per cubic millimeter of whole blood, whereas the red blood cells are measured in millions of cells per cubic millimeter of whole blood. A conventional print-out system can be used to obtain the results of the analysis.

A typical operation of my analyzer is as follows: A one milliliter specimen of blood 67 is placed in specimen cups 33 which in turn are placed in receptacle holders 32 on turntable 11. A typical turntable for use in my analyzer has forty-eight receptacle holders 32 and will, therefore, handle up to forty-eight samples of blood. The analyzer is activated and the first specimen cup is rotated into sampling position. As the specimen cup is moved into the sampling position, the sample is thoroughly mixed by the oscillations caused from the force exerted on paramagnetic pin 40 of receptacle holder 32 from the magnetic field of rotating magnet 31. This mixing is aided by the fins 44 and bottom recess 43 of specimen cup 33. Sample probe 17 is rotated about shaft 27 so that syringe needle 41 is immediately above specimen cup 33. Probe 17 descends downwardly with syringe needle 41 initially piercing filter paper 42 of the wiper apparatus. Syringe needle 41 enters blood samples 67 and a 20 microliter sample is drawn into the sample probe by means of suction created by pump 20. Probe 17 then ascends upwardly and the outer surface of syringe needle 41 is wiped clean by filter paper 42.

Sample probe 17 rotates over and deposits the blood specimen into white blood and hemoglobin cuvet 21 by a reversal of the pump 20. At that time, the sample is diluted with a filtered saline solution into a 1 to 250 dilution. The diluent may be added through the sampling probe or any other suitable means. The sample is mixed by any suitable means, such as a microstirring magnet which rotates between the two cuvets 21 and 22 and causes rotation of small metallic pins which are inserted into the cuvets.

After mixing, a 20 microliter sample of blood is drawn back into the syringe needle 41 by suction pump 20 and is transferred to cuvet 22, the red blood cell cuvet. There it is further diluted with saline in the proportion of 1 to 62,500. At the same time, the remainder of the diluted blood in cuvet 21 is mixed with .04 milliliters of filtered hemolyte, the lysing agent which destroys the red blood cells prior to a white blood cell count and develops a color in the solution for a hemolglobin determination.

At this time, the valve 23 is in the white blood cell position as shown in FIG. 13. The action of valve pump 24 directs any blood already tested in the system through the continuous passageway formed of hose 71, passageway 63, channel 58, and passageway 65 into a disposal.

At the same time, a sample is drawn from a cuvet 21 through tubing 70, passageway 62, channel 59, passageway 64, tubing 72 and into the blood counter 25. The hemoglobin content is determined by the photometric determination, whereas the white blood count is determined by counting the various reflections from the white blood cells.

The rotor member 29 of the valve 23 is then rotated to the red blood count position as shown in FIG. 14. As the valve pump 24 is activated, it initially draws any blood remaining in the system through the continuous passageway formed of tubing 72, passageway 64, channel 59, passageway 65 and tubing 73 into the disposal. At the same time, this draws the blood out of cuvet 22 through tubing 69, passageway 61, channel 58, passageway 63, and tubing 71 into blood counter 25 where the red blood count determination is made.

The process herein described covers the complete analysis of a single sample. The turntable is indexed forward to bring the next sample into sampling position. At the same time, a new filter paper area is rotated into position. The sampling and testing then proceeds to duplicate those procedures set out for sample No. 1.

While I have herein shown and described a preferred embodiment, it may be otherwise embodied within the scope of the appended claims.

I claim:

1. A blood sample analyzer comprising:

(A) a plurality of rotatably mounted blood specimen holders;

(B) means for magnetically oscillating said holders;

(C) at least two cuvets;

(D) sampling means for removing a blood sample from the holders to at least one of said cuvets and between said cuvets;

(E) means for cleaning the exterior of said blood removing means after withdrawal of blood from said holders;

(F) means for counting blood cells and determining hemoglobin content; and, (G) means for selectively drawing blood samples from said cuvets to said counting and determining means, said directing means including a valve.

2. The analyzer of claim 1 wherein the rotatable mounting for the blood specimen holders includes:

(A) a revolvable platform having a plurality of spaced holes about the periphery thereof;

(B) receptacle holders loosely held in said holes and each having a paramagnetic pin depending therefrom; and, (C) specimen cups loosely fitting in said receptacle holders for holding a blood sample.

3. The analyzer of claim 2 wherein the means for magnetically oscillating comprises a rotating north-south magnet, said magnet creating a magnetic field of changing polarity at any given point, the magnet positioned so that the field affects the paramagnetic pin depending from the receptacle holder and thereby oscillates the receptacle holder.

4. The analyzer of claim 2 wherein the cleaning means comprises a filter disc mounted adjacent said turntable and below said sampling means and having at least a portion extending over one of the specimen cups, whereby said sampling means pierces the filter disc prior to obtaining a sample and then moves through said filter paper after obtaining a sample, the filter disc cleaning the surface of the sampling means.

5. The analyzer of claim 4 wherein the filter disc is rotatably mounted and the mounting is indexed to said turntable whereby the filter disc rotates each time the turntable rotates.

6. The analyzer of claim 1 wherein the valve comprises:

(A) a stationary member having five passageways, each extending from separate openings on the top surface of the member to an opening at the side of said member, said passageways countersunk at their top surface;

(B) an O-ring positioned in each of the countersunk portions of said passageways, said O-rings extending slightly above the top surface of the stationary member; and, (C) a rotatable member positioned on the stationary member, supported on the O-rings and adapted for rotation thereon, said rotatable member having two channels, each extending from an opening in the bottom surface to another opening in the bottom surface, said channels being dimensioned so that each will connect two adjacent passageways in the stationary member, rotation of the member changing the passageways connected by the member.

7. The analyzer of claim 2 wherein a cover is pivotably mounted to cover and uncover the revolvable platform, and a shield is freely suspended from the cover and adapted to rest on a top surface of at least some of said specimen cups when said cover is in a closed position, said revolvable platform being free to revolve under said shield.

8. The analyzer of claim 2 wherein the specimen cup has spaced fins extending inwardly from the side walls adjacent the bottom.

9. A blood sample analyzer comprising:

(A) a rotatable turntable having a plurality of holes about the periphery;

(B) a plurality of receptacle holder loosely held in the holes (1) each receptacle holder having a paramagnetic pin extending from its base;

(C) a plurality of specimen cups loosely fitting inside said receptacle holders;

(D) a rotating magnet positioned so that the field affects at least one of the paramagnetic pins and oscillates the receptacle holder;

(E) two cuvets mounted adjacent the rotatable turntable;

(F) a filter disc rotatably mounted adjacent the turntable and having at least a portion extending over one of the specimen cups, the filter disc being indexed to the turntable whereby the filter disc rotates each time the turntable rotates;

G) a sampling probe mounted on an elevator shaft adjacent the turntable and being movable horizontally from a position above the filter disc and specimen cup to a position above the cuvets and being movable vertically from said elevated positions to positions within the specimen cup and cuvets;

(H) a blood counting means; and, (I) means, including a valve for selectively drawing solutions from the cuvets and passing them through said blood counting means.

10. In a blood analyzer in which a plurality of samples are mounted on rotating means and serially brought to a sampling station, improved means for mixing the samples comprising:

(A) a plurality of receptacle holders loosely held on said rotating means, each of said holders having a paramagnetic pin depending from its base; and (B) means for creating a magnetic field of constantly changing polarity positioned so that the field affects the paramagnetic pin of each receptacle holder immediately prior to the holder advancing to the sampling station thereby oscillating the receptacle holder.

11. The improvement of claim 10 including a specimen cup loosely fitting within the receptacle holder for holding said samples.

12. In a blood analyzer in which specimens are selectively drawn by a pump from separate cuvets to a blood counter, the improvement comprising a valve for directing the flow of blood from the separate cuvets to an analyzer having:

(A) a stationary member having a plurality of spaced passageways extending from separate openings on the top surface of the member to openings on the side walls of the member, each opening on the top surface having a countersunk portion at the top thereof and an additional channel leading out of the member;

(B) an O-ring positioned in each of said countersunk portions and extending slightly above the top surface of said stationary member; and, (C) a rotatable member positioned on said stationary member and supported by the O-rings, said member having at least two channels, each connecting a pair of openings on the bottom surface thereof, said channels being dimensioned so that each will connect two adjacent passageways in the stationary member, rotation of the member changing the passageways connected whereby the flow of the specimen from the cuvets to the blood counter can be selectively controlled.

13. The valve of claim 12 wherein said stationary member has five passageways and said rotatable member has two arcuate channels, two of said passageways being connected to separate cuvets, two additional passageways being connected to the blood counter and the last passageway being connected to a suction pump and each arcuate channel being dimensioned to connect the passageway connected to the pump and one of the passageways connected to the blood counter and to connect one passageway connected to a cuvet with the same passageway connected to the blood counter.

14. In a blood analyzer in which a plurality of samples mounted on rotating means are consecutively brought to a sampling station where a sampling probe withdraws a specimen, improved means for cleaning the exterior surface of the probe comprising:

(A) a turntable mounted for rotation adjacent the rotating means near the sampling station and adapted to support a filter paper disc having a larger diameter than the turntable;

(B) a stationary paper support having a U-shaped end portion adapted to engage the periphery of a filter paper disc and positioned over the sampling station, the paper support having an opening therethrough directly above the sampling station to permit passage of the sampling probe through the support member; and (C) cover means to hold a filter paper disc to the turntable.

References Cited

UNITED STATES PATENTS 3,320,618 5/1967 Kuch et al. ------ 356—39 XR

RONALD L. WIBERT, Primary Examiner

O. B. CHEW III, Assistant Examiner

U.S. Cl. X.R.

356—197